US007118641B2

(12) United States Patent
Roesler et al.

(10) Patent No.: US 7,118,641 B2
(45) Date of Patent: Oct. 10, 2006

(54) FLOOR VINYL REPAIR TECHNIQUE AND TOOL

(76) Inventors: Tracy P. Roesler, 5215 E. Orchard, Nampa, ID (US) 83687; Glen L. Durrant, 7825 W. Elm Brook, Boise, ID (US) 83703

( * ) Notice: Subject to any disclaimer, the term of this patent is extended or adjusted under 35 U.S.C. 154(b) by 308 days.

(21) Appl. No.: 10/667,294

(22) Filed: Sep. 16, 2003

(65) Prior Publication Data

US 2004/0123935 A1 Jul. 1, 2004

Related U.S. Application Data

(63) Continuation-in-part of application No. 09/609,082, filed on Jun. 30, 2000, now Pat. No. 6,619,360.

(51) Int. Cl.
*B32B 35/00* (2006.01)

(52) U.S. Cl. .............................. 156/94; 83/175; 83/176; 52/514

(58) Field of Classification Search ................. 156/71, 156/91, 92, 94, 98, 229, 250, 256, 258; 52/384, 52/391, 514, 514.5, 746.1, 746.12, 747.11; 83/29, 55, 175, 176, 953; 29/402.01, 402.06, 29/402.08, 402.09, 402.11, 402.12; 269/53, 269/54.1, 54.5, 289 R, 309, 902, 909; 264/36.1, 264/36.11

See application file for complete search history.

(56) References Cited

U.S. PATENT DOCUMENTS

| 2,289,561 | A | 7/1942 | West ........................... 411/404 |
| 2,366,510 | A | 1/1945 | Frank .......................... 206/343 |
| 3,911,516 | A | 10/1975 | Einhorn ...................... 248/497 |
| 4,167,974 | A | 9/1979 | Job ............................... 169/38 |
| 4,765,501 | A | 8/1988 | Kao ........................... 220/4.21 |
| 5,370,487 | A | 12/1994 | Kracke ..................... 248/316.7 |
| D414,825 | S | 10/1999 | Gans ......................... D21/464 |
| 6,196,782 | B1 | 3/2001 | Wagner et al. .............. 411/485 |
| 6,619,360 | B1 * | 9/2003 | Roesler et al. .............. 156/494 |

OTHER PUBLICATIONS

Print out of www.sierra.com dated Jun. 9, 2000.*
Print out of www.todayshomeowner.com dated Jun. 9, 2000.*

* cited by examiner

*Primary Examiner*—Justin Fischer
(74) *Attorney, Agent, or Firm*—Pedersen & Co., PLLC; Ken J. Pedersen; Barbara S. Pedersen

(57) ABSTRACT

A floor covering repair technique and tool includes placement of a spacer between a patch and a damaged floor covering piece before cutting through both layers. This way, the replacement patch is elevated slightly above the damaged piece and this slight elevation allows for a slight increase in the perimeter/total area of the patch, which offsets the slight retraction/contraction of the edges of the patch and/or the edges of the original flooring after the cut. This results in a more exact fit between the patch and the surrounding, original undamaged when the patch is installed.

13 Claims, 4 Drawing Sheets

FLOOR VINYL REPAIR TECHNIQUE AND TOOL

This application is a continuation-in-part of and claims priority of prior application Ser. No. 09/609,082, entitled "Floor Vinyl Repair Technique And Tool" filed Jun. 30, 2000, issuing as U.S. Pat. No. 6,619,360 on Sep. 16, 2003, which is incorporated herein by this reference.

BACKGROUND OF THE INVENTION

1. Field of the Invention

This invention relates generally to flooring and more specifically to repairs for damaged vinyl floors.

2. Related Art

Vinyl as a flooring material has become very popular. Many millions of square feet of vinyl flooring are installed every year. Often, after or during installation, the vinyl flooring is damaged by dents, holes, scrapes or scratches. Then, the vinyl flooring needs to be repaired.

Typically, the repair of this damage to vinyl flooring is done by:

Providing an oversized replacement patch that matches the pattern in the damaged area (for example, by cutting from a roll or large sample of the vinyl);

Aligning the patch and taping it in place;

Cutting through both layers with a utility knife along a cutting line determined to surround and not cut through the damaged area;

Removing the patch and peeling up the damaged flooring with a scraper, taking care not to damage the cut edges, and using a heat gun or iron to soften the adhesive, if necessary;

Applying new flooring adhesive to the newly-cut patch and pressing it in place into the opening created by cutting the damaged flooring from the undamaged vinyl; and Wiping off any excess adhesive with a damp cloth and covering the patch with a weight for 24 hours.

Preferably, the cut is made along the flooring pattern lines, if any, to make the repair less visible. If it is discovered that the section to be removed isn't attached to the subfloor by adhesive, an attempt to slip some new adhesive underneath the exposed edges of the original vinyl to keep it in place is recommended.

However, whenever this prior art repair technique is practiced, the seam (between the original vinyl and the replaced, repair piece) is noticeable. The seam may be barely noticeable, but it is there nonetheless, and irritating to discriminating homeowners and floor repairmen. The reason for the seam is because typically the cut replacement piece turns out to be slightly smaller than the original damaged piece. Typically, the industry craftsmen have filled this seam with seam sealer or filler. However, it has been a desire in the industry to eliminate this seam space as much as possible.

This imperfect fit may be because the top piece of vinyl is stretched slightly when it is cut with the knife while overlaying the relative soft damaged piece. The damaged piece, on the other hand, is constrained by the supporting floor and is totally and/or substantially bound by an underlying adhesive, so it does not stretch, or stretches less, when cut. After the cut is performed, the replacement piece tends to be slightly smaller than the original damaged piece, leaving a slight seam between the original, undamaged vinyl and the inserted replacement piece.

Alternatively, the imperfect fit may be because, when the semi-elastic replacement patch is cut out from the oversized patch sheet, the replacement patch may tend to contract slightly, that is, the edges of the replacement patch pull inward slightly, which results in a slightly smaller replacement patch than originally intended. Also, when the semi-elastic vinyl material on the floor is cut, the edges around the cut-out damaged piece may tend to contract slightly especially if not totally secured to the floor by adhesive, that is, the edges of vinyl surrounding and defining the opening pulling-back slightly. This would tend to increase the size of the opening in the floor vinyl into which the replacement patch will be placed. Therefore, either the edges of the replacement patch, the edges of the remaining original vinyl, or both, may have retracted in opposite directions, resulting in a small gap between the edges that must be filled and/or hidden.

Thus, whether the imperfect fit occurs due to stretching and subsequent retraction, and/or contraction of edges after they are cut from adjacent vinyl material, the imperfect fit may be attributed to retraction or contraction of the vinyl.

The present invention addresses the need for a closer fit between the inserted replacement vinyl patch piece and the surrounding, original undamaged vinyl, preferably by adapting the method and apparatus for cutting the vinyl patch.

SUMMARY OF THE INVENTION

The present invention is a floor vinyl repair technique and tool. According to the present invention, the prior art repair technique is practiced, except a specially-adapted spacer is placed between the patch and the damaged area prior to taping the oversized replacement patch in place atop the damaged section in preparation for cutting through both layers with the knife. Typically, the spacer is placed or pressed firmly against/into the damaged section generally at, or near, the middle of this section, before the oversized replacement patch is placed above the damaged area. This way, when the patch is taped in place, the center of the patch is slightly elevated above the damaged piece. This slight elevation allows for a slight increase in the perimeter of the patch, or, in other words, a slight increase in the total area of the replacement piece once it is cut. This increase in the perimeter dimension(s)/area of the cut replacement patch offsets the retraction (in opposite directions) of the patch and original vinyl flooring that is believed to occur after both layers of material are cut with the knife. As a result, a more exact fit between the patch and the surrounding, original undamaged vinyl may be achieved when the patch is installed.

Typically, the amount of original vinyl to be removed and, correspondingly, the size of the replacement patch, is determined by the size and shape of the dent, hole or surface abrasion to be repaired. Preferably, a sufficient amount of vinyl is removed so that no significant distortion of the original pattern or texture is noticeable. By trial and error and experience, we have determined an estimated relationship between the size of the spacer to be inserted between the two layers of vinyl before the cut, and the size of the replacement patch.

DESCRIPTION OF THE PREFERRED EMBODIMENTS

Figure 1:
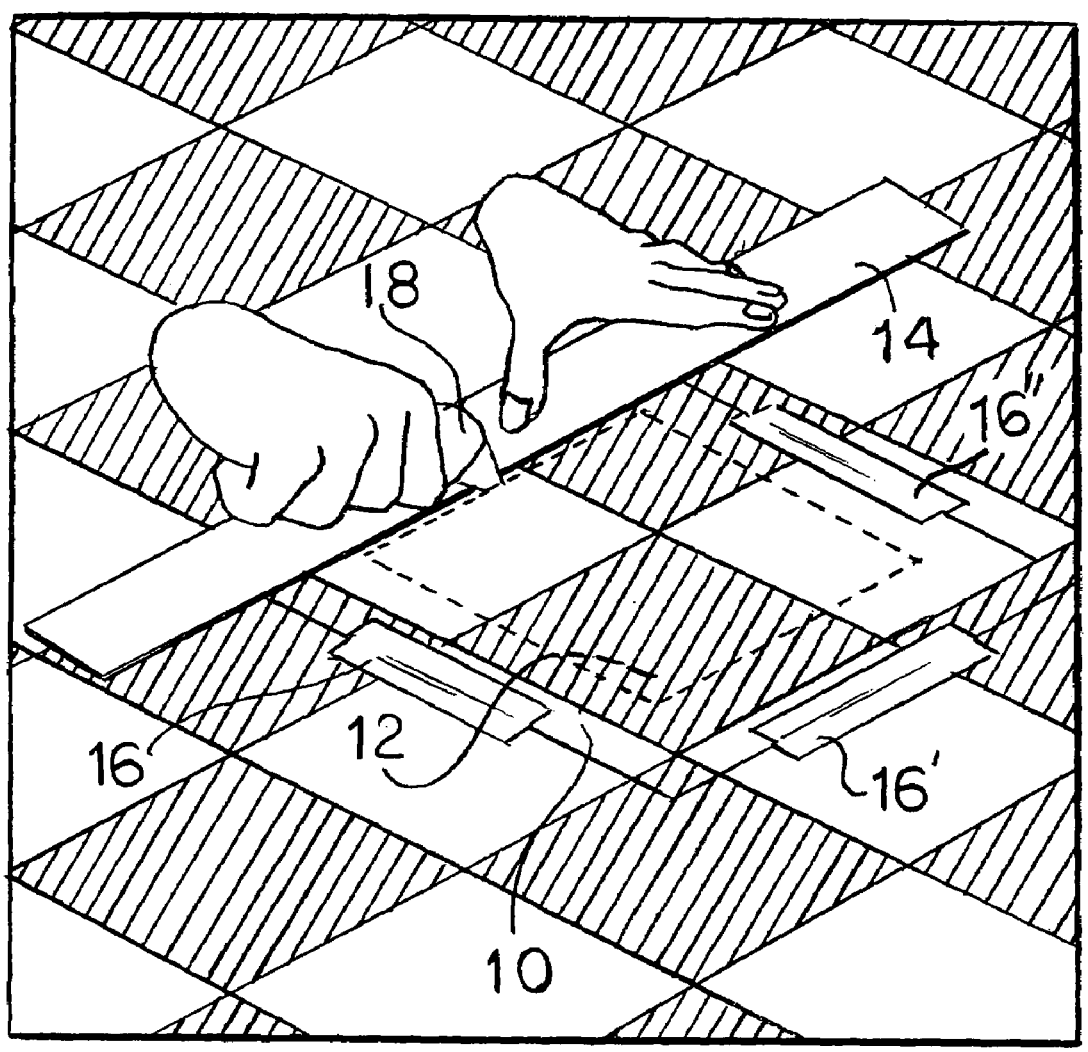
FIG. 1 is a perspective view of the prior art vinyl flooring repair technique.
Figure 2:
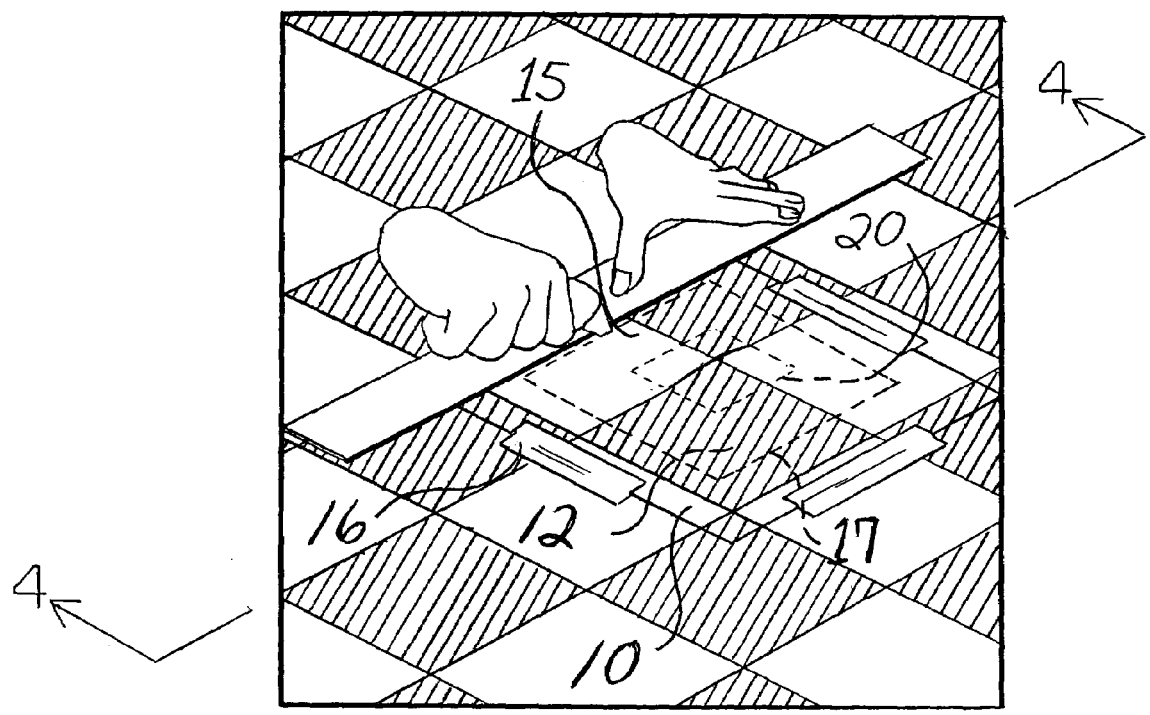
FIG. 2 is a perspective view of one embodiment of the vinyl flooring repair technique according to the present invention.
Figure 3A:
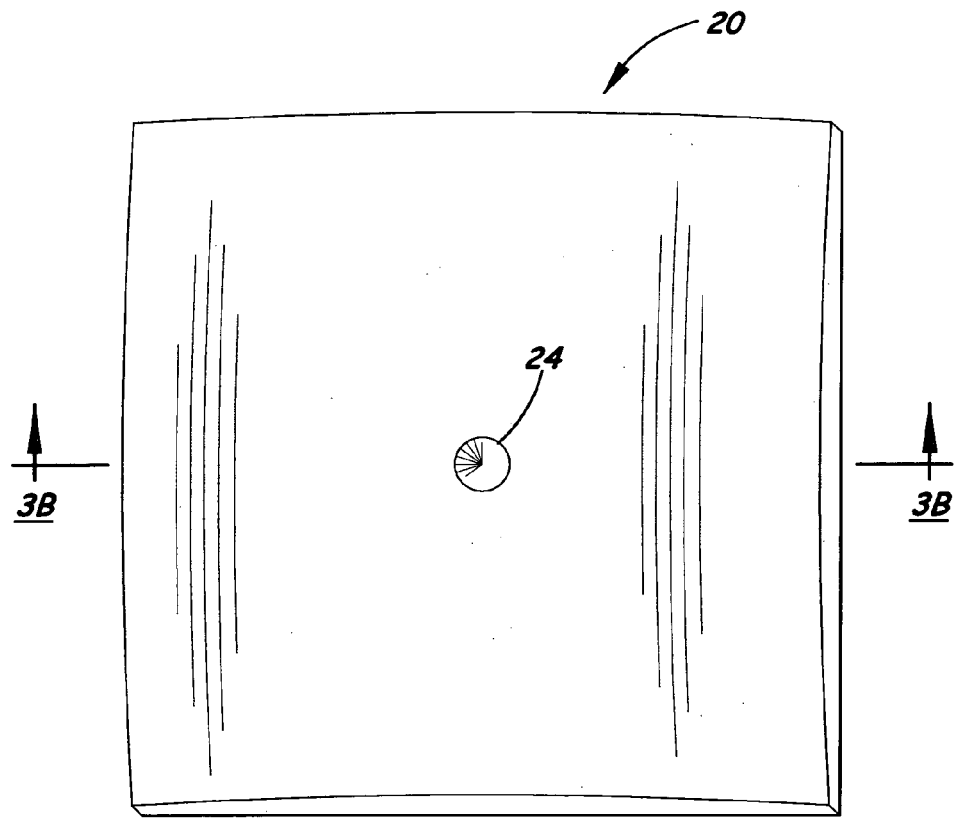
FIG. 3A is a top perspective view of one embodiment of the repair tool insert/spacer according to the present invention.
Figure 3B:
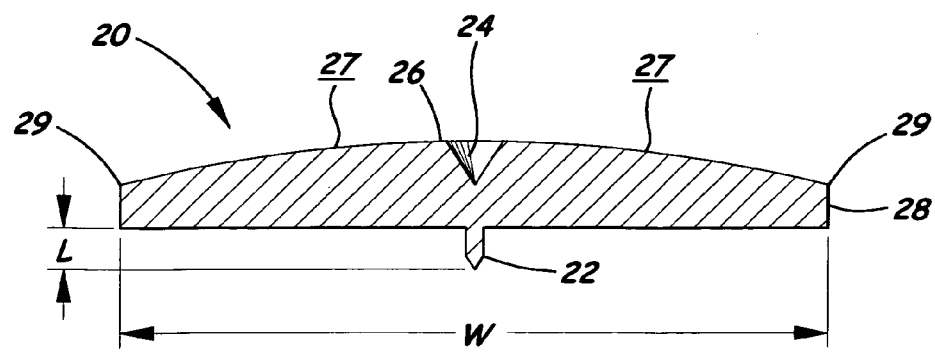
FIG. 3B is a side cross-sectional view of the embodiment of FIG. 3A.
Figure 4:
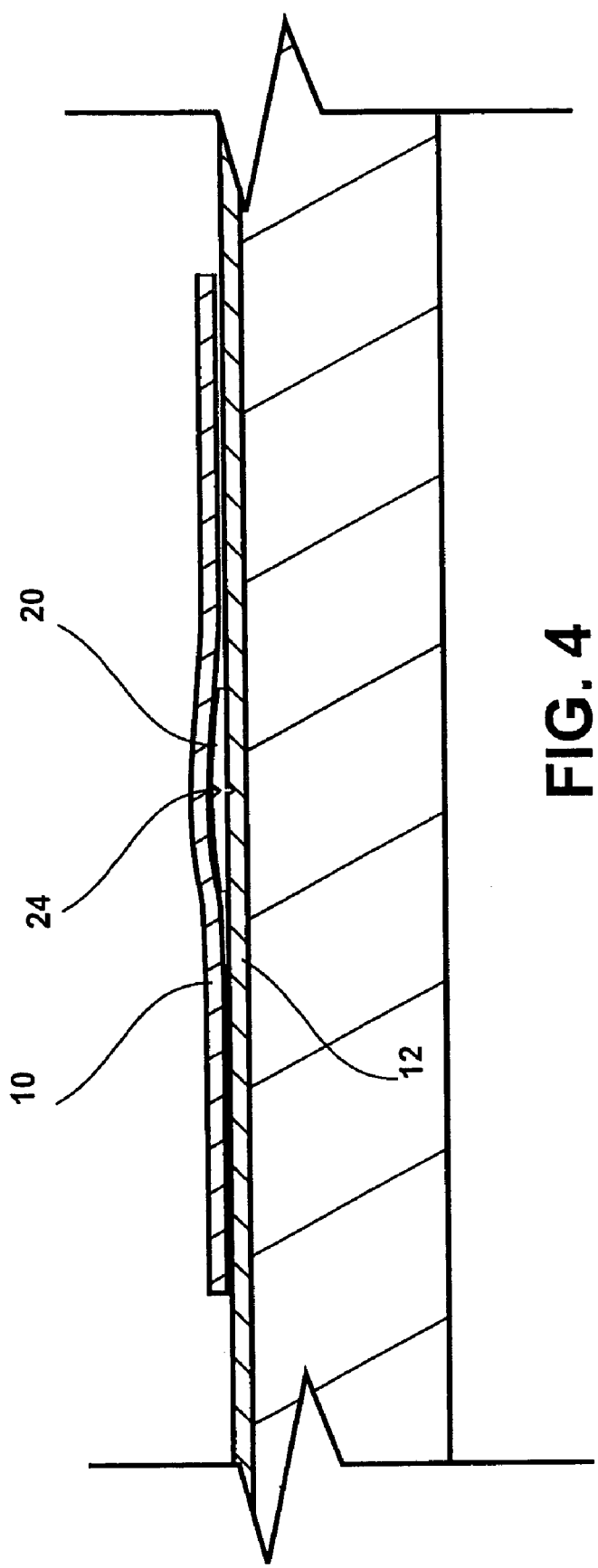
FIG. 4 is a side-cross-sectional view along line 4—4 in FIG. 2.

Referring to the Figures, there is shown in FIG. 1 the prior art vinyl flooring repair technique described in the Related Art section above. In FIGS. 2–4, there are depicted several, but not all, embodiments of the present invention.

According to FIG. 1, oversized patch 10 is laid over damaged vinyl section 12 so that patch 10 extends over the surrounding, original undamaged vinyl 14. The oversized patch 10 is aligned to match the pattern on damaged section and the adjacent undamaged vinyl, and is taped into place with tape strips 16, 16' and 16". Then, both layers of vinyl (oversized patch 10 and damaged section 12) are cut with utility knife 18, for example, along the dashed lines shown in FIG. 1 to form replacement patch 15 and opening 17 in the floor vinyl. The oversized patch 10 is then removed, including the newly-cut replacement patch 15 that has been cut out generally from the center of the oversized patch 10. The damaged section 12 is peeled up off the floor with a scraper (not shown). Then, new adhesive is applied to the newly-cut replacement patch 15 and the patch 15 is pressed into place in the opening 17 where the damaged section 12 was removed. Any excess adhesive is removed with a damp cloth, and this replacement patch 15 is covered with a weight for about 24 hours to hold it in place while the adhesive dries.

In FIG. 2 depicts the vinyl floor repairing technique according to the present invention. In the invented technique, the steps of the prior art repair technique are practiced, except that a specially-adapted spacer 20 is placed on top of the damaged section 12 prior to positioning the oversized replacement patch 10 over the damaged section 12 and taping or otherwise securing it in place. As a result, the oversized replacement patch is elevated slightly above the damaged piece prior to cutting through both layers with the knife. During cutting, this slight elevation increases the perimeter of the newly-cut patch to offset contraction/retraction of the patch and/or of the original vinyl sheet that may happen after the cut(s) are made.

Preferably, the spacer 20 is placed in the center of the damaged section that will be cut out, which may or may not correspond to the center of the damage in the vinyl, that is, the hole/cut/gouge/scrape in the vinyl. By placing the spacer 20 in the middle of the section that will be cut out, it is more likely that the spacer will evenly and accurately raise the oversized patch in a manner that will consistently increase the perimeter of the replacement patch 15 an appropriate and equal amount all around the patch 15. For example, if the damage comprises a hole in the vinyl, the repairman may choose to cut out a larger area in which the hole is slightly to one side of that area, so that the spacer may be placed/pressed into the damaged vinyl in the center of the area to be cut out but not in the center of the hole.

Increasing the perimeter dimension(s) and total area of the replacement patch, via spacer insertion prior to cutting, serves to counteract the retraction/contraction of the vinyl material encountered after the sections are cut. Larger replacement patches may have a tendency to retract/contract more than smaller patches and the migration of the edges of the original vinyl may also be greater for larger removed sections. Further, a larger patch should be raised up in its center more than a smaller patch, in order to obtain an appropriate amount/percentage of perimeter/area increase. Consequently, depending upon the size of the patch, preferably different sized spacers may be used. A combination thickness and radius or size of the domed-disc spacer may be important. For example, the inventors have determined that, for replacing a damaged section about 3 to 5 inches square, a domed-disc about 1/8" high at the center and about 7/8" square (disc #1) is preferably used. Table 1 offers a rough guide for repairing damaged square sections.

TABLE 1

| Size of Square | Size of Disc |
| --- | --- |
| 3 to 5" | 1/8" high × 7/8" (disc #1) |
| 5 to 8" | 3/16" high × 1 1/2" (disc #2) |
| 8 to 11" | stack disc #1 on top of disc #2 |
| 11 to 18" | 5/16" high × 2 3/4" (disc #3) |
| 18 to 24" | stack disc #2 on top of disc #3 |
| 24" and up | stack disc #1 on top of disc #2, and disc #2 on top of disc #3 |

The spacer/insert may be various shapes that conveniently take up space between oversized patch 10 and damaged section 12. A squared-off domed-disc is preferred, as illustrated in FIGS. 3A and 3B, because the square shape helps align the disc in the center of damaged section 12, which is usually cut out as a square or rectangular shape. The inventors prefer the domed-disc because the patch 10 slides easily over the dome when aligning it with the pattern in the original, undamaged vinyl 14. A square, domed-disc spacer is also preferred, as the dome shape tends to raise all regions of the replacement patch an approximately equal amount and, hence, to increase the perimeter of the patch an approximately equal amount all the way around the patch. Other shapes may be used, with those having a central region 26 raised relative to their edges 28 being preferred. For example, in FIG. 3B, one may see that the square, domed spacer includes a central region 26 having a thickness from top to bottom that is greater than the thickness of the spacer at the edge regions 28. One may see that the top surface 27 of the spacer in cross-section in FIG. 3B is generally convex all the way from the central region 26 to the outer perimeter edges 29 of the spacer.

Preferably, the spacer 20 has a pointed tip or other gripper(s) on its underside, so that it may be firmly pressed into the damaged vinyl to retain it in place during the cutting procedure. Preferably, a pointed tip 22 is provided on the bottom of the domed-disc to better engage the damaged section 12 once the disc is centered. Other gripping member(s) may be used to keep the spacer in place.

The preferred pointed tip is of a small enough diameter, short enough length, and sharp enough distal end that it easily "pokes" into the damaged vinyl without a great deal of effort by the user and without extending through the damaged vinyl into the floor underneath the vinyl. For example, the preferred pointed tip is a short, sharp protrusion that has a length L of less than about 1/10 of the width W of the spacer.

Also, preferably, a depression 24 is provided on the top center of each domed-disc for receiving the pointed tip of another spacer. This enables several of the discs to be stacked for use and for storage, by virtue of the pointed tip of an upper spacer fitting into the depression of the lower spacer. While the preferred depression 24 is conical, a depression more closely fitting the point tip 22 is also acceptable, for example.

While the invented methods and apparatus are specially-adapted for vinyl flooring, the inventors envision that other flooring coverings may also benefit from the invention. For example, the methods and apparatus may be beneficial to other sheet floor coverings, especially to those that are semi-elastic or partially elastic.

Although this invention has been described above with reference to particular means, materials and embodiments, it is to be understood that the invention is not limited to these disclosed particulars, but extends instead to all equivalents within the scope of the following claims.

We claim:

1. In a floor vinyl repair method, the improvement which comprises placing a spacing apparatus between a vinyl patch and a damaged vinyl section prior to cutting through the vinyl patch and through the damaged vinyl section, wherein the spacing apparatus has a bottom surface, and a top surface with a central region and outer perimeter edges, and wherein the top surface is generally convex all the way from said central region to said outer perimeter edges.

2. A method for repairing floor vinyl, comprising:
   placing a spacer between a vinyl patch and a damaged vinyl section, spacer having bottom surface and a top surface with a central region and outer perimeter edges, wherein the top surface is generally convex all the way from said central region to said outer perimeter edges, and wherein said placing is performed so that
   said vinyl patch rests on said generally convex top surface to be elevated slightly above said damaged vinyl section;
   cutting both said vinyl patch and said damaged vinyl section, whereby the slight elevation of said vinyl patch allows for a slight increase in a perimeter of said vinyl patch to offset contraction of said vinyl patch after cutting; and
   replacing said damaged vinyl section with said cut vinyl patch.

3. A method for repairing floor vinyl, comprising:
   placing a spacer between a vinyl patch and a damaged vinyl section so that said vinyl patch is elevated slightly above said damaged vinyl section;
   cutting both said vinyl patch and said damaged vinyl section, whereby the slight elevation of said vinyl patch allows for a slight increase in a perimeter of said vinyl patch to offset contraction of said vinyl patch after cutting; and
   replacing said damaged vinyl section with said cut vinyl patch; and
   wherein the spacer is shaped like a domed-disc.

4. The method of claim 3, wherein a plurality of said spacers are stacked between the vinyl patch and the damaged vinyl section to increase the elevation of the vinyl patch above said damaged vinyl section.

5. A method for repairing floor covering comprising:
   placing a domed-disc spacing apparatus between a floor covering patch and a damaged floor covering section so that said floor covering patch is elevated slightly above said damaged floor covering section prior to cutting both said patch and said damaged section;
   cutting both said patch and said damaged section, whereby the slight elevation of said patch allows for a slight increase in a perimeter of said patch to offset retraction of edges of said patch after cutting; and
   replacing said damaged vinyl section with said cut patch.

6. The method of claim 5, wherein the domed-disc has edges forming a square shape.

7. The method of claim 5, wherein a plurality of said domed-disc spacing apparatus are stacked in between the patch and the damaged section.

8. A method for repairing floor covering, comprising:
   placing a spacing apparatus between a floor covering patch and a damaged floor covering section so that the patch is elevated slightly above the damaged section, wherein the spacing apparatus comprising a protrusion on a bottom side of the spacing apparatus;
   sticking said protrusion into the damaged floor covering section to temporarily secure the spacing apparatus to the damaged floor covering section;
   cutting both the patch and the damaged section, whereby the slight elevation of the patch allows for a slight increase in a perimeter of the patch to offset stretching of the patch prior to cutting; and
   replacing the damaged section with said cut patch.

9. The method of claim 8, wherein the spacing apparatus has a top surface that is a dome shape.

10. The method of claim 8, wherein the spacing apparatus has edges forming a square shape.

11. The method of claim 8, wherein a plurality of said spacing apparatus are stacked in between the patch end the damaged section.

12. The method of claim 8, wherein said protrusion is a pointed tip.

13. The method of claim 8, wherein said protrusion is a sharp protrusion.

* * * * *